United States Patent
Baleani et al.

(10) Patent No.: US 8,127,180 B2
(45) Date of Patent: Feb. 28, 2012

(54) ELECTRONIC SYSTEM FOR DETECTING A FAULT

(75) Inventors: Massimo Baleani, Monte San Vito (IT); Marco Losi, Bollate (IT); Alberto Ferrari, Rome (IT); Leonardo Mangeruca, Genoa (IT)

(73) Assignees: STMicroelectronics S.R.L., Agrate Brianza (IT); PARADES S.C.A.R.L., Rome (IT)

( * ) Notice: Subject to any disclaimer, the term of this patent is extended or adjusted under 35 U.S.C. 154(b) by 160 days.

(21) Appl. No.: 12/616,690

(22) Filed: Nov. 11, 2009

(65) Prior Publication Data

US 2010/0131801 A1 May 27, 2010

(30) Foreign Application Priority Data

Nov. 21, 2008 (IT) .............................. MI2008A2068

(51) Int. Cl.
*G06F 11/00* (2006.01)
(52) U.S. Cl. ........... 714/25; 714/4.1; 714/4.11; 714/4.2; 714/43; 714/48; 714/56; 714/797
(58) Field of Classification Search .................... 701/29, 701/31, 33, 34, 45; 714/4.1, 4.11, 4.2, 25, 714/43, 48, 56, 797
See application file for complete search history.

(56) References Cited

U.S. PATENT DOCUMENTS

| | | | |
|---|---|---|---|
| 3,770,948 A | | 11/1973 | Caputo et al. |
| 3,864,670 A | * | 2/1975 | Inoue et al. ...................... 714/12 |
| 4,156,929 A | | 5/1979 | Eichenlaub et al. |
| 4,774,709 A | * | 9/1988 | Tulplue et al. ................. 714/4.1 |
| 4,816,990 A | * | 3/1989 | Williams ....................... 713/375 |
| 4,972,415 A | * | 11/1990 | Walter et al. ................... 714/797 |
| 4,980,857 A | * | 12/1990 | Walter et al. ..................... 714/45 |
| 5,005,174 A | * | 4/1991 | Bruckert et al. ................ 714/11 |
| 5,689,632 A | * | 11/1997 | Galy et al. ...................... 714/11 |
| 5,732,209 A | | 3/1998 | Vigil et al. |
| 5,838,900 A | * | 11/1998 | Horvath et al. ................ 714/56 |

(Continued)

FOREIGN PATENT DOCUMENTS

EP 0 496 509 A1 7/1992

OTHER PUBLICATIONS

Wensley, J.H.; Lamport, L.; Goldberg, J.; Green, M.W.; Levitt, K.N.; Melliar-Smith, P.M.; Shostak, R.E.; Weinstock, C.B.; , "SIFT: Design and analysis of a fault-tolerant computer for aircraft control," Proceedings of the IEEE, vol. 66, No. 10, pp. 1240-1255, Oct. 1978.*

(Continued)

*Primary Examiner* — Robert Beausoliel, Jr.
*Assistant Examiner* — Joshua P Lottich
(74) *Attorney, Agent, or Firm* — Seed IP Law Group PLLC

(57) ABSTRACT

An electronic adapter device and an electronic system that comprises the electronic adapter device are described. The electronic adapter device comprises a device and a redundant device able to receive data from a first plurality of electronic devices and redundant data from a second plurality of electronic devices, and able to select therefrom first data and first redundant data respectively. The electronic adapter device also comprises a controller able to receive the selected first data and the selected first redundant data and is able to generate therefrom an error signal indicating a fault in an electronic device of the first plurality or a fault in the device.

32 Claims, 8 Drawing Sheets

U.S. PATENT DOCUMENTS

| | | | |
|---|---|---|---|
| 6,128,755 A * | 10/2000 | Bello et al. | 714/715 |
| 6,823,251 B1 * | 11/2004 | Giers | 701/76 |
| 6,925,578 B2 * | 8/2005 | Lam et al. | 714/4.5 |
| 6,952,404 B2 * | 10/2005 | Hayashi et al. | 370/242 |
| 7,159,152 B2 * | 1/2007 | Von Wendorff | 714/47.1 |
| 7,444,565 B1 * | 10/2008 | Haight | 714/725 |
| 7,512,871 B1 * | 3/2009 | Carmichael et al. | 714/797 |
| 7,620,465 B2 * | 11/2009 | Degoul et al. | 700/82 |
| 7,694,170 B2 * | 4/2010 | Callaway et al. | 714/4.1 |
| 7,721,004 B2 * | 5/2010 | Vasko et al. | 709/249 |
| 7,721,149 B2 * | 5/2010 | Essame et al. | 714/11 |
| 7,886,191 B2 * | 2/2011 | Weiberle et al. | 714/36 |
| 7,958,394 B1 * | 6/2011 | Bridgford | 714/25 |
| 2002/0129296 A1 * | 9/2002 | Kwiat et al. | 714/10 |
| 2002/0152418 A1 * | 10/2002 | Griffin et al. | 714/11 |
| 2006/0020717 A1 * | 1/2006 | Remboski et al. | 709/249 |
| 2006/0107112 A1 * | 5/2006 | Michaelis et al. | 714/15 |
| 2006/0190702 A1 * | 8/2006 | Harter et al. | 712/15 |
| 2007/0260939 A1 * | 11/2007 | Kammann et al. | 714/48 |

OTHER PUBLICATIONS

Baleani et al., "Fault-Tolerant Platforms for Automotive Safety-Critical Applications," Proceedings of the International Conference on Compiler, Architecture and Synthesis for Embedded Systems (CASES '03), Oct. 30, 2003-Nov. 2, 2003, San Jose, California, 8 pages.

* cited by examiner

ELECTRONIC SYSTEM FOR DETECTING A FAULT

BACKGROUND

1. Technical Field

This disclosure generally concerns an electronic system for carrying out the communication between a plurality of electronic devices. More specifically, the present disclosure concerns an electronic system with a "master-slave" architecture for detecting a fault in the system itself.

2. Description of the Related Art

Electronic systems with a "master-slave" architecture able to detect a fault of one of the "master" devices are known. This is implemented, for example, by replicating the main master device with a redundant master device, which is synchronized with the main master device. A controller performs (for example, on every period of the system's clock signal) a comparison between the data generated by the main master device and the data generated by the replicated master device: in case a different value between the data generated by the main master device and the data of the redundant one is detected, the controller generates an error signal which indicates a fault in one of the masters.

These systems have the disadvantage of only being able to detect only one fault of the master, but are not able to detect errors of other parts of the electronic system.

BRIEF SUMMARY

In an embodiment, an electronic module comprises: a receiving device configured to receive data from a first plurality of electronic devices and to select therefrom first data; a redundant receiving device configured to receive redundant data from a second plurality of redundant devices and to select therefrom first redundant data; and a controller configured to detect errors in the first plurality of electronic devices and in the receiving device based on the selected first data and the selected first redundant data and to generate an error signal in response to either one of the detected errors. In one embodiment, the receiving device comprises: an arbiter configured to receive the data and to generate therefrom an enable signal; and a selector configured to receive the data and to select therefrom the first data as a function of the enable signal; the redundant receiving device comprises: a redundant arbiter configured to receive the redundant data and to generate therefrom a redundant enable signal; and a redundant selector configured to receive the redundant data and to select therefrom the first redundant data as a function of the redundant enable signal; and the error signal indicates a detected fault of at least one of an electronic device of the first plurality, of the arbiter, and of the selector. In one embodiment, the electronic module further comprises a delay device configured to delay the selected first data. In one embodiment, the error signal indicates a location of a detected fault.

In one embodiment, an electronic system comprises: a first plurality of electronic devices configured to transmit data; a second plurality of electronic devices configured to transmit redundant data; a receiving device configured to receive the data from the first plurality of electronic devices and to select first data; a redundant receiving device configured to receive the redundant data from the second plurality of electronic devices and to select first redundant data; a controller configured to detect faults in the electronic device and in the receiving device based on the selected first data and the selected first redundant data, to generate an error signal in response to a detected fault, and to transmit the selected first data or the selected first redundant data; and an output-receiving device configured to receive the data transmitted by the controller. In one embodiment, the error signal indicates a location of a detected fault. In one embodiment, the receiving device comprises: an arbiter configured to receive the data and to generate therefrom an enable signal; and a selector configured to receive the data and to select therefrom the first data as a function of the enable signal; the redundant device comprises: a redundant arbiter configured to receive the redundant data and to generate therefrom a redundant enable signal; and a redundant selector configured to receive the redundant data and to select therefrom the first redundant data as a function of the redundant enable signal; and the error signal indicates a fault of at least one of an electronic device of the first plurality, of the arbiter, and of the selector. In one embodiment, the electronic system further comprises a transmitting device configured to transmit data different from the data transmitted by the devices of the second plurality, wherein: the receiving device is further configured to receive the data transmitted by the transmitting device and to select the first data from the data transmitted by the transmitting device and the data transmitted by the first plurality of electronic devices; and the redundant device is further configured to receive the data transmitted by the transmitting device and to select the first redundant data from data transmitted by the transmitting device and the redundant data transmitted by the second plurality of electronic devices. In one embodiment, the electronic system further comprises: a third plurality of electronic devices configured to transmit a second set of redundant data corresponding to the data transmitted by the first plurality of electronic devices; and a second redundant device configured to receive the second set of redundant data and to select therefrom second redundant data, wherein the controller is further configured to receive the second redundant data and to selectively generate the error signal as a function of the selected first data, of the selected first redundant data and of the selected second redundant data. In one embodiment, the electronic system further comprises: a third plurality of electronic devices configured to transmit a second set of redundant data corresponding to the data transmitted by the first plurality of electronic devices; and a second redundant device configured to receive the second set of redundant data and to select therefrom second redundant data, the second redundant device comprising: a second redundant arbiter configured to receive the second set of redundant data and to generate therefrom a second redundant enable signal; and a second redundant selector configured to receive the second set of redundant data and to select therefrom the second redundant data as a function of the second redundant enable signal, wherein the controller is further configured to receive the second redundant data and to selectively generate the error signal as a function of the selected first data, of the selected first redundant data and of the selected second redundant data. In one embodiment, the electronic system further comprises a delay device configured to delay the selected first data. In one embodiment, the receiving device comprises: an arbiter configured to receive the data and to generate therefrom an enable signal, and to receive the redundant data and a mode control signal; a selector configured to receive the data and to select therefrom the first data as a function of the enable signal; the redundant device comprises: a redundant arbiter configured to receive the redundant data and to generate therefrom a redundant enable signal, and to receive the data from the first plurality of electronic devices and the mode control signal; and a redundant selector configured to receive the redundant data and to select therefrom the first redundant data as a function of the redundant enable signal; and wherein in a first operation mode the electronic devices of the second plurality are configured to transmit redundant data corresponding to the data transmitted by the electronic devices of the first plurality, and wherein in a second operation mode the electronic devices of the second plurality are configured to transmit data independent of the data transmitted by the electronic devices of the first plurality. In one embodiment, the electronic system further comprises: communication channels between the first plurality of electronic devices and the receiving device and between the second plurality of electronic devices and the redundant receiving device, wherein the controller is configured to selectively generate the error signal upon detecting a fault in the communication channels. In one embodiment, the system is configured in a master-slave architecture, the first plurality of electronic devices are master devices, the second plurality of electronic devices are redundant master devices, the output-receiving device is a slave device, the receiving device is configured to generate an enable signal indicating a master of the first plurality authorized to access the slave device, the redundant receiving device is configured to generate a redundant enable signal indicating an authorized redundant master of the second plurality, and the slave device is configured to receive the data transmitted by the authorized master.

In one embodiment, an electronic system comprises: a first plurality of electronic devices configured to transmit data; a second plurality of electronic devices configured to transmit redundant data; a receiving device configured to receive the data from the first plurality of electronic devices and to select and transmit first data; a redundant receiving device configured to receive the redundant data from the second plurality of electronic devices and to select first redundant data; a controller configured to detect faults in an electronic device of the first plurality of electronic devices and in the receiving device based on the selected first data and the selected first redundant data, and to generate an error signal in response to a detected fault; and an output-receiving device configured to receive the data transmitted by the receiving device.

In one embodiment, a method of detecting errors in an electronic system having at least one processor comprises: selecting, under control of the at least one processor, first data from data transmitted by a first plurality of electronic devices; selecting, under control of the at least one processor, second data from data transmitted by a second plurality of electronic devices; and detecting errors in an electronic device of the first plurality and in the selecting of the first data based on the first data and the second data, and generating an error signal in response to detecting an error.

In one embodiment, a method of detecting errors in an electronic system having at least one processor comprises: selecting, under control of the at least one processor, first data from data transmitted by an electronic device and data transmitted by a first plurality of electronic devices; selecting, under control of the at least one processor, second data from data transmitted by the electronic device and data transmitted by a second plurality of electronic devices, the data transmitted by the electronic device being independent of the data transmitted by the second plurality of electronic devices; detecting, under control of the at least one processor, faults in an electronic device of the first plurality and in the selecting of the first data; and generating an error signal in response to detection of a fault.

In one embodiment, a tangible computer readable memory medium's contents cause a system having at least one processor to perform a method, the method comprising: selecting, under control of the at least one processor, first data from data transmitted by a first plurality of electronic devices; selecting, under control of the at least one processor, second data from data transmitted by a second plurality of electronic devices; detecting, under control of the at least one processor, errors in an electronic device of the first plurality and in the selecting of the first data based on the first data and the second data; and generating an error signal in response to a detected error.

In one embodiment, a system comprises: means for selecting first data from data transmitted by a first plurality of electronic devices; means for selecting second data from data transmitted by a second plurality of electronic devices; and means for detecting errors in the first plurality of electronic devices and in the means for selecting first data.

The advantages of an embodiment may include:
it is possible to detect a fault in the path between the masters and the slaves like, for example:
  errors or faults in the communication channels between the masters and the slaves,
  a fault of the arbiter of the masters, which could block the access of a master to the slave devices and allow only to other masters to access the slaves, or the arbiter could increase the priority of a master and so delaying the access to the slaves for the other masters;
  a fault of the selectors of data transmitted by the masters, which can cause the selection of a wrong master,
  a fault of the decoders of the addresses transmitted by the masters to select the slave, because the decoders could erroneously generate the addresses that identify the slave, causing, for example, the selection of the wrong slave or preventing the selection of a slave,
  a fault of components connected to the slave devices: for example, in the case where the slave device is a memory, this component is a memory controller, and
  a fault of the interrupt controller connected to the slaves via an interrupt communication channel to receive the indication of an interrupt from the slaves: for example, the interrupt controller generates the indication of an interrupt of a peripheral that in actually did not occur, or generates the indication of an interrupt of a peripheral different from the one that really generated the interrupt.

BRIEF DESCRIPTION OF THE SEVERAL VIEWS OF THE DRAWINGS

Further characteristics and advantages of embodiments will be apparent from the description that follows of embodiments and variants, provided by way of example with reference to the enclosed drawings, wherein.

DETAILED DESCRIPTION

In the description that follows, various specific details are given for a better understanding of embodiments of the disclosure. The embodiments described may be implemented without one or several of these details, or by using other methods, equipment, materials, etc. In certain cases, materials or operations that are in and of themselves well known are not described in detail in order to not obfuscate certain aspects of the described embodiments. The reference to an "embodiment" in the descriptions signifies that a characteristic or a particular structure described in relation with this embodiment is included in this embodiment. Thus, the utilization of expressions "in one embodiment" or "according to one embodiment" in various parts of the description are not necessarily referring to the same embodiment. Moreover, the particular characteristics relative to each embodiment may be combined in an appropriate manner to form one or more other embodiments.

Figure 1A:
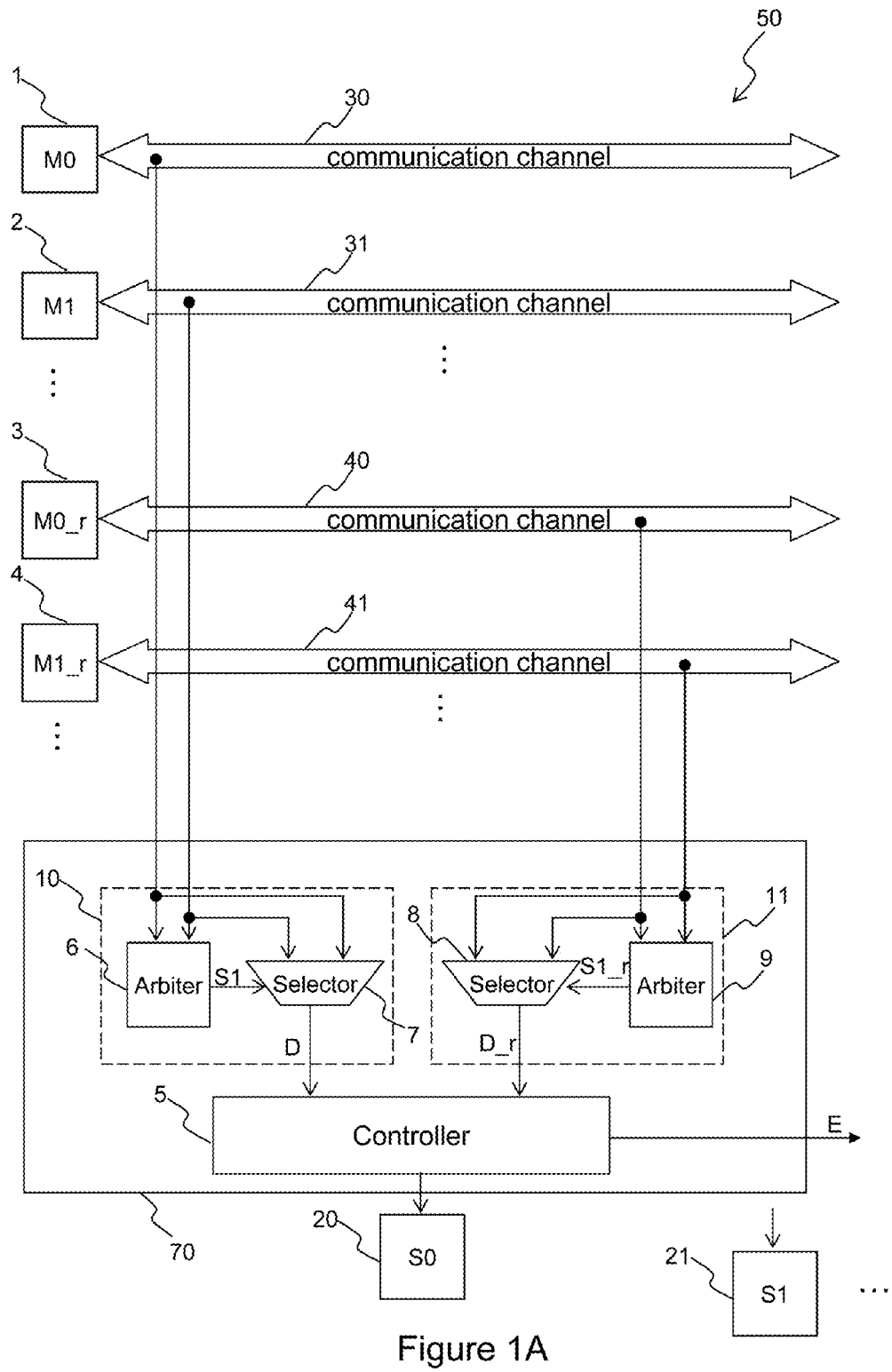
FIG. 1A schematically shows an electronic system according to an embodiment.

With reference to FIG. 1A, an electronic system 50 according to the first embodiment is shown.

The electronic system 50 comprises:
- a first plurality of electronic devices 1, 2, . . . (also indicated as M0, M1, . . . respectively)
- a second plurality of electronic devices 3, 4, . . . (also indicated as M0_r, M1_r, . . . respectively);
- communication channels 30, 31, . . . , 40, 41, . . . ;
- a device 10 and a redundant device 11 a controller 5;
- one or more devices 20, 21, . . . (also indicated as S0, S1, . . . respectively)

The first plurality of devices 1, 2, . . . are configured to transmit data on communication channels 30, 31, . . . . The second plurality of devices 3, 4, . . . are configured to transmit redundant data on communication channels 40, 41, . . . ; in particular, device 3 of the second plurality is such to transmit data which are redundant with respect to the data transmitted by device 1 of the first plurality, in order to detect a fault in the system 50, as it will be explained better hereinafter. Similarly, device 4 of the second plurality is such to transmit data that is redundant with respect to the data transmitted by device 2 of the first plurality, in order to detect a fault in the system 50.

It should be noted that the term "data" is intended both as information data (for example, data to be written into a memory) and as control data (for example, control data for a memory, such as memory addresses).

It should also be noted that by the expression "redundant" data transmitted by device 3 of the second plurality, it is intended that said device 3 of the second plurality is such to transmit (in a certain time interval) the same data of the respective device 1 of the first plurality when there are no faults of the devices 1 and 3. For example, there are no faults of possible devices connected before device 1 of the first plurality and such to transmit data to device 1 and there are no faults of possible devices connected before device 3 of the second plurality and such to transmit data to device 3, thus device 1 receives the same data as device 3: if there are no faults of device 1 and device 3, device 3 is such to transmit (in a certain time interval) the same data of device 1. If instead there is a fault of the device 1 of the first plurality (and, more in general, of possible devices connected before device 1) or of the device 3 of the second plurality (and, more in general, of possible devices connected before device 3), the data transmitted by device 3 of the second plurality is different from the data transmitted by device 1 of the first plurality. Similar considerations are also applicable to the "redundant data" transmitted by the other devices M1_r, . . . of the second plurality.

Devices 1, 2, . . . of the first plurality are therefore replicated by devices 3, 4, . . . of the second plurality respectively.

Device 10 is such to receive as input (via the communication channels 30, 31, . . . ) the data transmitted by the first plurality of devices 1, 2, . . . and is such to provide an output of first data D selected from the data transmitted by the first plurality of devices 1, 2, . . . (for example, selecting the data transmitted by device 1), as it will be explained more in detail afterwards. It should be noted that the representation of device 10 in FIG. 1A is only functional and therefore device 10 can be physically implemented with one or more blocks, as it will be explained more in detail afterwards.

Redundant device 11 is such to receive (via communication channels 40, 41, . . . ) the redundant data transmitted by the second plurality of devices 3, 4, . . . and is such to provide an output of first redundant data D_r selected from the data transmitted by the second plurality of devices 3, 4, . . . (for example, selecting redundant data transmitted by device 3), as it will be explained more in detail afterwards. It should be noted that the representation of redundant device 11 in FIG. 1A is only functional and therefore redundant device 11 can be physically implemented with one or more blocks, as it will be explained more in detail afterwards. The purpose of redundant device 11 is to replicate one or more functions of the devices along the data (or address) path between the first plurality of devices 1, 2, . . . and devices 20, 21, . . . , as it will be explained afterwards. The system 50 comprises:
- a path for accessing device 20, where the path is defined by the outputs of the first plurality of devices 1, 2, . . . (in particular, by the ports to which devices 1, 2, . . . are connected), by communication channels 30, 31, . . . and by device 10 (in particular, until the output of device 10), and
- a corresponding redundant (or replicated) path to access the same device 20, wherein the redundant path is defined by the outputs of the second plurality of devices 3, 4, . . . (in particular, by the ports to which devices 3, 4, . . . are connected), by communication channels 40, 41, . . . and by redundant device 11 (in particular, until the output of redundant device 11): this redundant path enables the detection of faults in the system 50 and in particular faults to access the device 20, as it will be explained more in detail afterwards.

Similar considerations can also be applied for access the devices 21, . . . .

The controller 5 is such to receive the first data D selected by the device 10 and the first redundant data D_r selected by the redundant device 11 and is such to generate therefrom an error signal E indicating a fault in the system 50, in particular a fault of an electronic device of the first plurality or a fault in device 10. Therefore the controller 5 has the function of detecting a fault in the system 50, for example by comparing the first data D selected by the device 10 and the first redundant data D_r selected by the redundant device 11.

Furthermore, the controller 5 is such to transmit the selected first data D or the selected first redundant data D_r to the device 20.

It should be noted that the electronic system 50 schematically shows a device 10, a redundant device 11 and a controller 5 electrically associated to the device 20. More in general, the system 50 comprises a plurality of devices 20, 21, . . . and to each device 20, 21, . . . is associated a device having the same functionality as device 10, a device having the same functionality as redundant device 11 and a controller having the same functionality as controller 5, Device 10, the redundant device 11 and the controller 5 are indicated hereinafter as electronic adapter device 70, which is connected to the first and to the second plurality of electronic devices and to device 20. In an embodiment, the electronic adapter device 70 is a single component, which can be implemented with software (for example, with VHDL language=Very high-speed integrated circuit Hardware Description Language, with a macro) or can be implemented in hardware with an integrated circuit (or part thereof).

In case of a plurality of devices 20, 21, . . . , each of these is connected to a corresponding electronic adapter device, that is device 20 is connected to adapter device 70, device 21 is connected to adapter device 71 (for simplicity, it is not shown in FIG. 1A) implemented the same way as adapter device 70, . . . .

In order to explain the embodiment, it is supposed that the system 50 is such that it operates according to a "master-slave" architecture, wherein:
- devices 1, 2, . . . are such to operate as "masters" and shall be indicated hereinafter as M0, M1, . . . respectively, wherein with master is intended that devices M0, M1, . . . are capable of initiating a communication with the "slave" devices 20, 21, . . . ,
- devices 3, 4, . . . are such to operate as redundant masters of devices 1, 2, . . . respectively and shall be indicated hereinafter as M0_r, M1_r, . . . respectively, wherein with master is intended that devices M0_r, M1_r, . . . are capable of initiating a communication with the "slave" devices 20, 21, . . . , and
- devices 20, 21, . . . are such to operate as "slaves" (like a peripheral or a memory) and shall be indicated hereinafter as S0, S1, . . . respectively, wherein with "slave" is intended that devices S0, S1, . . . are not capable of initiating a communication.

For example, the masters M0, M1, . . . , M0_r, M1_r, . . . are processors and slave S0 is a peripheral, and in particular it is a memory (RAM, Flash) in which the processors are adapted to write data and from which they can read data.

According to the master-slave architecture, device 10 is implemented with an arbiter 6 such that it receives data transmitted by the masters M0, M1, . . . and such that it generates therefrom an enable signal S1; device 10 also comprises a selector 7 such that it receives data transmitted by the masters M0, M1, . . . and such that it selects one of the data transmitted by the masters M0, M1, . . . as a function of the enable signal S1. The purpose of the arbiter 6 is to establish which one of the masters M0, M1, . . . is authorized to access the slave S0 within a certain time interval (typically, in a certain period of the clock signal of the system 50) and this can occur according to different criteria. The selector 7 then has the function of selecting the data transmitted by the master (for example, M0) authorized by the arbiter 6 to access slave S0. For example, the arbiter 6 has the function of establishing which one of the masters M0, M1, . . . is authorized to access the slave S0 in a certain time interval according to one of the following criteria:
- to each master is assigned a defined priority which is different from the priority of all the other masters (for example, master M0 has the highest priority, master M1 has a priority lower than M0, and thus the subsequent masters have decreasing priorities). In this case, the arbiter 6 is such that it authorizes the master with the highest priority;
- to the masters are assigned respective time intervals (of equal length) wherein the respective master is enabled to access slave S0 and these time intervals are repeated periodically, according to a clock signal.

Similarly, the redundant device 11 in the master-slave architecture is implemented with a redundant arbiter 9 such to receive the redundant data transmitted by the redundant masters M0_r, M1_r, . . . and such to generate therefrom a redundant enable signal S1_r; the redundant device 11 also comprises a redundant selector 8 such to receive the redundant data transmitted by the redundant masters M0_r, M1_r, . . . and such to select one of the redundant data transmitted by the redundant masters M0_r, M1_r, . . . as a function of the redundant enable signal S1_r. The purpose of the redundant arbiter 9 is to establish which one of the redundant masters M0_r, M1_r, . . . is authorized to access the slave S0 in a certain time interval, according to the various criteria previously indicated. The redundant selector 8 then has the function of selecting the redundant data transmitted by the redundant master (for example, M0_r) authorized by the redundant arbiter 9. In the master-slave architecture, the purpose of the controller 5 is to detect a fault of the system 50, for example a fault of an electronic device of the first plurality, or a fault in the arbiter 6 or a fault of the selector 7.

It will be described hereinafter the operation of the electronic system 50 of FIG. 1A, supposing a master-slave architecture. For simplicity, it is supposed that the electronic system 50 comprises two masters M0 and M1, two corresponding redundant masters M0_r and M1_r, the arbiter 6 and the corresponding redundant arbiter 9, the selector 7 and the corresponding redundant selector 8, the controller 5 and a slave S0; it is also supposed that the masters M0, M1, M0_r, M1_r are processors, that the slave S0 is a memory and that the processors perform write operations in the memory S0.

Processor M0 transmits over the communication channel 30 the data to be written into memory S0 and the signals controlling the memory S0 and processor M0_r transmits over the communication channel 40 the same data to be written into memory S0 and the same signals controlling the memory S0. Therefore processor M0 is replicated by processor M0_r and this can be achieved in different ways: for example, processor M0_r executes the same code of processor M0 and receives at each clock signal period the same input data as processor M0 thereby generating the same output data (in the example, the same data to be written into memory S0 and the same signals controlling memory S0) which are transmitted over communication channel 40.

Similarly, processor M1 transmits over the communication channel 31 other data to be written into memory S0 and other signals controlling memory S0 and processor M1_r transmits over communication channel 41 the same other data to be written to memory S0 and the same other control signals.

The arbiter 6 receives from channel 30 the data (transmitted by processor M0) to be written into memory S0 and the signals controlling the memory S0, receives from channel 31 the other data (transmitted by processor M1) to be written into memory S0 and the other control signals of the memory S0 and, for each clock signal period, establishes (according to the previously indicated criteria) which processor (between M0 and M1) to authorize for writing into memory S0. For example, suppose that the arbiter 6 authorizes processor M1 (which, for example, has a priority greater than processor M0) to write data into memory S0: the arbiter 6 thus generates the enable signal 51, which has a value such that the selector 7 selects on its output the data (of processor M1) to be written into memory S0 and the control signals of the memory S0.

Similarly, the redundant arbiter 9 receives from channel 40 the redundant data (transmitted by processor M0_r) and redundant control signals, receives from channel 41 the other redundant data (transmitted by processor M1_r) and the other redundant control signals and, for each clock signal period, establishes (according to the previously indicated criteria) which redundant processor (M0_r or M1_r) to authorize. In the example, it is supposed that the arbiter 6 authorizes processor M1 for writing data into memory S0 and thus also the redundant arbiter 9 authorizes the redundant processor M1_r and generates the enable signal S1_r which has a value such that the redundant selector 8 selects on its output the redundant data (of the redundant processor M1_r) and the redundant control signals.

Therefore the controller 5 receives as input the data to be written and the signals controlling processor M1, receives on the other input the redundant data and the redundant control signals of redundant processor M1_r, performs a comparison between the data to be written and the redundant data and checks if they are the same, performs a comparison between the control signals and the redundant control signals and checks if they are the same:

- if both comparisons are equal, no fault has been detected in the system 50, that is no fault of the processor M1 and no fault in the path from processor M1 to memory S0; in this case, the controller 5 does not generate any error signal E;
- if at least one of the comparisons is not equal, at least one fault has occurred in the system 50; the fault can occur in the processor M1, or on the communication channel 30, or on the arbiter 6, or on the selector 7. In this case, the controller 5 generates an error signal E which indicates a fault in the electronic system 50.

In the case where no fault in the system 50 is detected, the controller 5 transmits the data (initially transmitted by processor M1 or M1_r) to memory S0, wherein they are written.

Figure 1B:
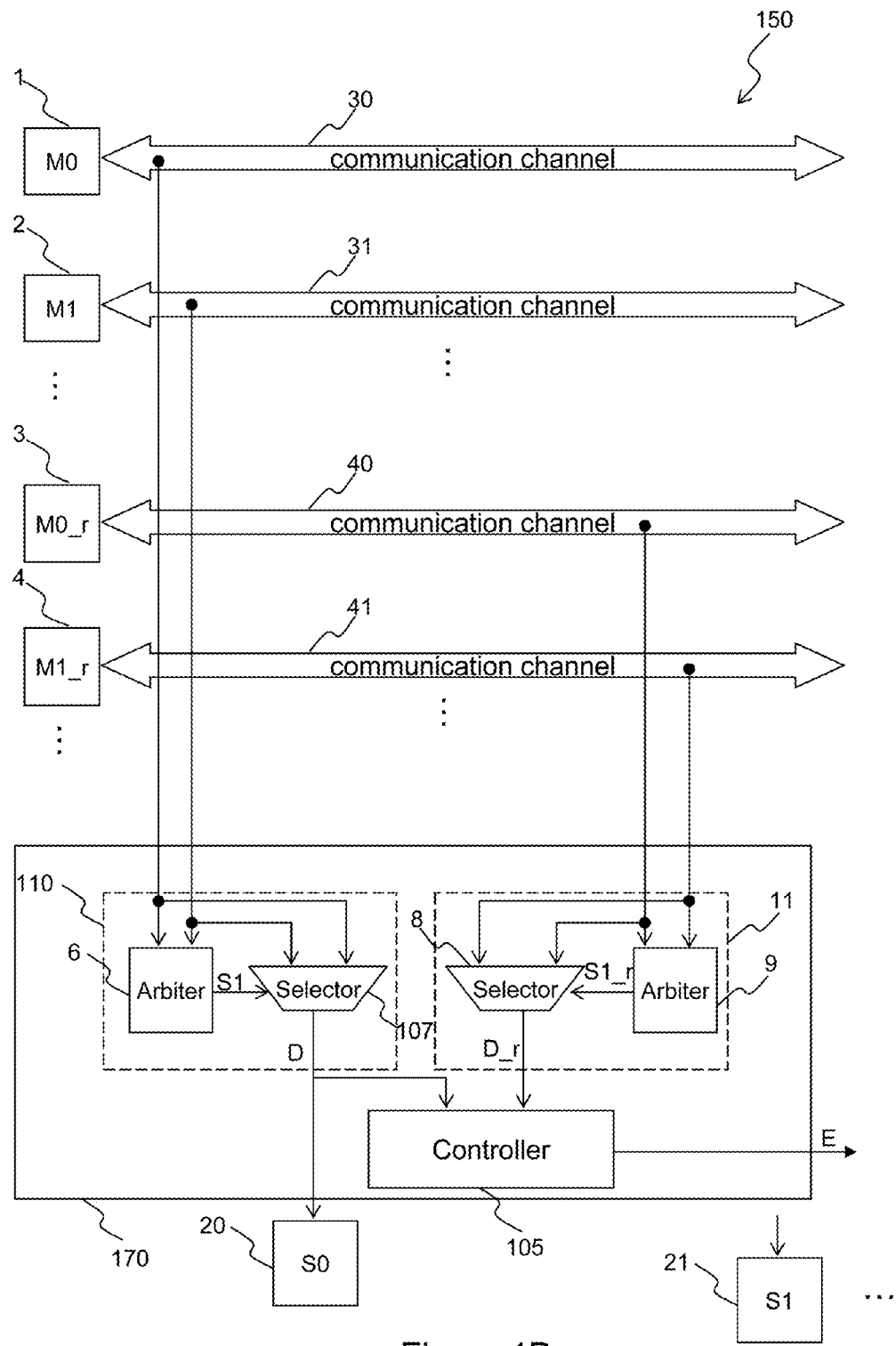
FIG. 1B schematically shows a variant of the electronic system according to an embodiment, FIG. 2 schematically shows an electronic system according to an embodiment, FIG. 3 schematically shows an electronic system according to an embodiment, FIG. 4 schematically shows an electronic system according to an embodiment, FIG. 5A schematically shows an electronic system according to an embodiment, FIG. 5B schematically shows an electronic system according to an embodiment, FIG. 6 schematically shows an electronic system according to an embodiment.

FIG. 1B shows another electronic system 150, similar to the electronic system 50 of FIG. 1A, but wherein the controller 105 is arranged in parallel to the device 20 (also indicated as S0 to indicate that it is a slave device). It should be noted that in this description, identical or similar blocks, components or modules are indicated in the figures with the same reference numbers.

According to this embodiment shown in FIG. 1B, the selector 107 is such to receive data transmitted by the masters M0, M1, . . . and such to select one of the data sets transmitted by the masters M0, M1, . . . as a function of the enable signal 51; moreover, the output of the selector 107 is connected both to controller 105 and to the slave device S0, that it transmits the selected data both to controller 105 and to slave device S0.

Therefore the slave device S0 is such to receive the data selected by selector 107 (and not by the controller 105 as in the embodiment of FIG. 1A) and the controller 105 is not connected to the slave device S0 (and is such to generate the error signal E indicating a fault in the system, as previously explained).

Figure 2:
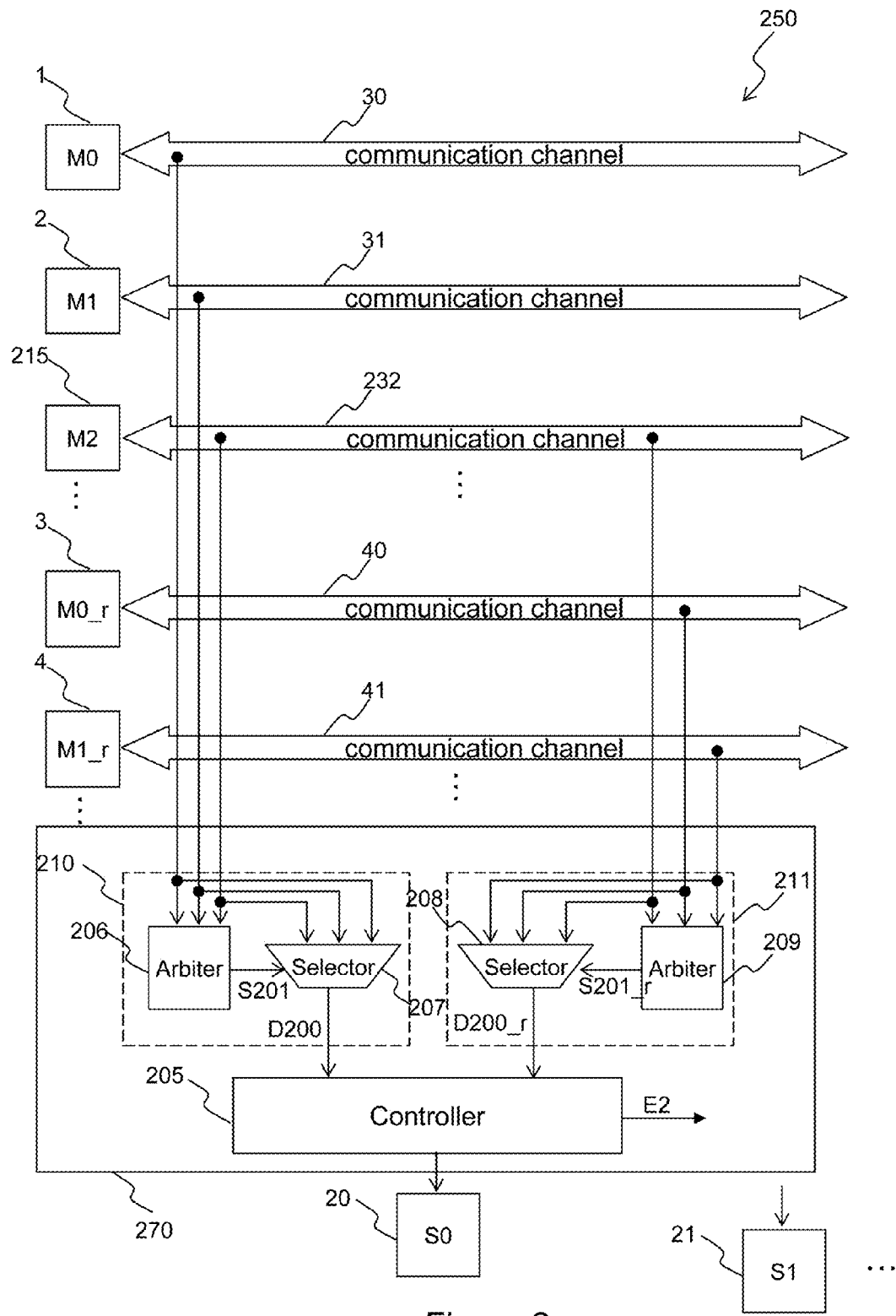

FIG. 2 shows an electronic system 250 according to another embodiment, similar to the embodiment of FIG. 1A, but wherein the electronic system 250 comprises another electronic device 215 which does not have a replicated device in the second plurality; supposing that the architecture of the system 250 is of the master-slave type, the electronic device 215 is such to operate as a master and thus is indicated as M2.

The device 210 is such to receive as input (via communication channels 30, 31, 232 . . . ) the data transmitted by the first plurality of devices 1, 2, . . . and the data transmitted by the other electronic device 215, and is such to provide an output of first data D200 selected from the data transmitted by the first plurality of devices 1, 2, . . . and by the other device 215. The redundant device 211 is such to receive (via communication channels 40, 41, 232 . . . ) the redundant data transmitted by the second plurality of devices 3, 4, . . . and the data transmitted by the other electronic device 215, and is such to provide an output of first redundant data D200_r selected from the data transmitted by the first plurality of devices 1, 2, . . . and by the additional device 215.

In the particular case of a master-slave architecture for the system 250, the device 215 is a master M2. The device 210 is implemented with an arbiter 206 such to receive the data transmitted by the masters M0, M1 and by the master M2 and such to generate therefrom an enable signal S201; device 210 further comprises a selector 207 such to receive the data transmitted by the masters M0, M1 and by the master M2, and such to select one of the data transmitted by the masters M0, M1, M2 as a function of the enable signal S201_r. Similarly, the redundant device 211 is implemented with a redundant arbiter 209 such to receive the redundant data transmitted by the redundant masters M0_r, M1_r and by the master M2 and such to generate therefrom a redundant enable signal S201_r; redundant device 211 further comprises a redundant selector 208 such to receive the redundant data transmitted by the redundant masters M0_r, M1_r and by the master M2 and such to select one of the redundant data transmitted by the redundant masters M0_r, M1_r and by the master M2 as a function of the redundant enable signal S201_r.

The electronic system 250 has the advantage of allowing the use in the same system of both replicated devices (1,3; 2,4 in FIG. 2) and of non-replicated devices (215 in FIG. 2), maintaining the possibility of detecting a fault of the replicated devices and also maintaining the possibility of detecting a fault of the arbiter 206 or of the selector 207, both in the case of data transmitted by the replicated devices and in the case of data transmitted by the non-replicated devices.

Figure 3:
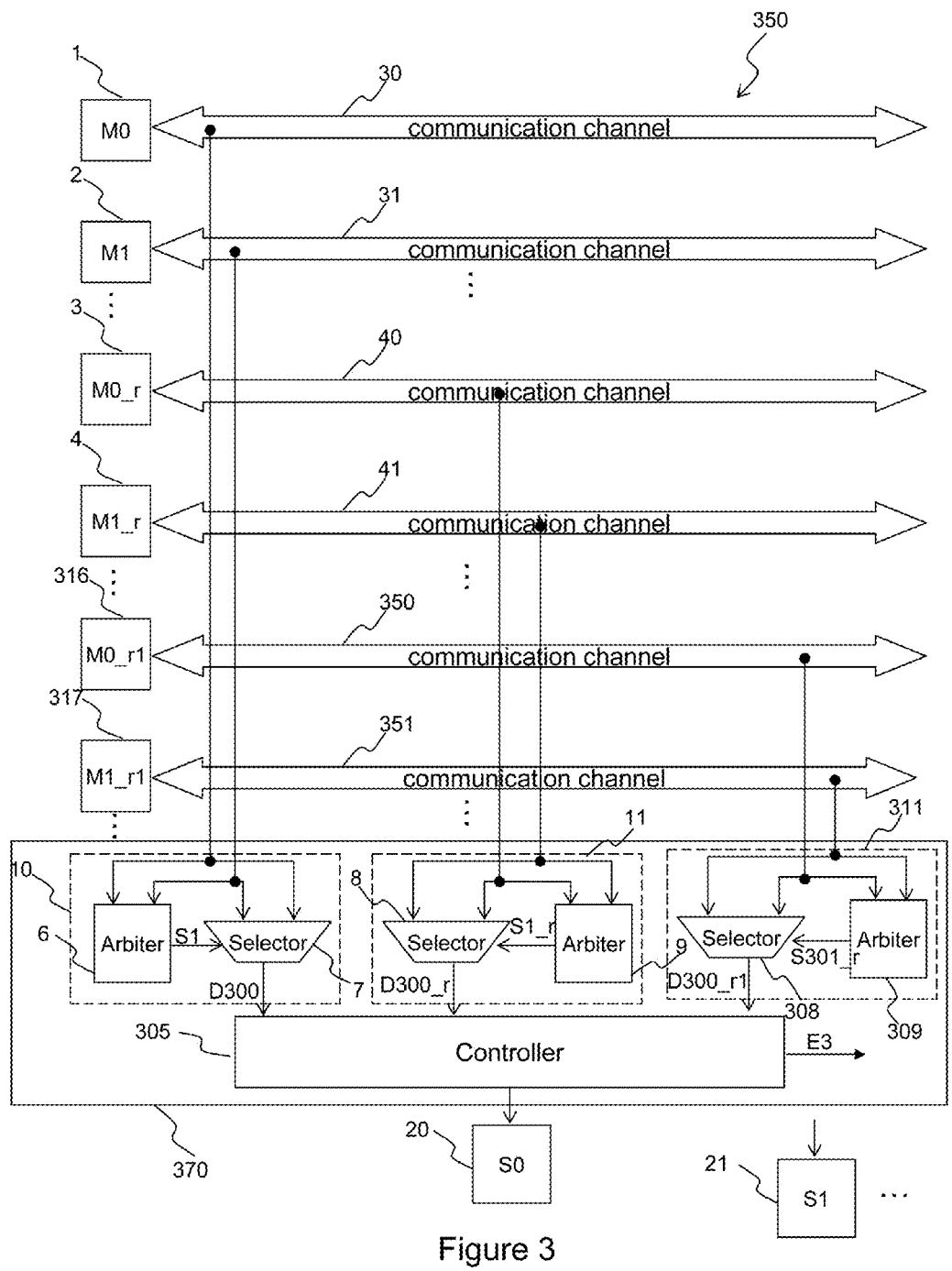

FIG. 3 shows an electronic system 350 according to another embodiment similar to the embodiment in FIG. 1A, but wherein the electronic system 350 comprises another redundant path between the outputs of a third plurality of electronic devices 316, 317, . . . and the device 20.

The system 350 comprises a third plurality of electronic devices 316, 317, . . . and comprises another redundant device 311 such to receive (via the communication channels 350, 351, . . . ) the other redundant data transmitted by the third plurality of devices 316, 317, . . . and such to select therefrom other first redundant data D300_r1 (for example, selecting redundant data transmitted by the device 316). The redundant device 311 has the function to replicate one or more functionalities of the devices along the data (or address) path between the first plurality of devices 1, 2, . . . and the devices 20, 21, . . . .

The controller 305 is such to receive the first data D300 selected by the device 10, the first redundant data D300_r selected by the redundant device 11 and the other first redundant data D300_r1 selected by the other redundant device 311, and is such to generate therefrom an error signal E3 indicating a fault in the system 350. Therefore the controller 305 has the function of detecting a fault in the system 350. Moreover, the controller 305 is such to transmit (in the case where no fault is detected in the system 350) to the device 20 the first data D300 or the first redundant data D300_r or the other first redundant data D300_r1.

Supposing that the architecture of the system 350 is of the master-slave type, the electronic devices 316, 317, . . . of the third plurality are such to operate as masters and thus are indicated as M0_r1, M1_r1, . . . respectively.

In particular, the master devices M0_r1, M1_r1, . . . are such to operate as redundant masters of master devices M0, M1, . . . (in the same way as previously explained for the master devices M0_r, M1_r, . . .) and thus are such to transmit other redundant data corresponding to the data transmitted by master devices M0, M1, . . . .

The redundant device 311 comprises a redundant arbiter 309 such to receive the redundant data transmitted by the redundant masters M0_r1, M1_r1, . . . and such to generate therefrom another redundant enable signal S301_r; the redundant device 311 also comprises a redundant selector 308 such to receive the other redundant data transmitted by the redundant masters M0_r1, M1_r1, . . . and such to select one of the redundant data transmitted by the redundant masters M0_r1, M1_r1, . . . as a function of the redundant enable signal S301_r. The redundant arbiter 309 has the function to establish which of the redundant masters M0_r1, M1_r1, . . . is authorized to access the slave S0 in a certain time interval, according to the various criteria previously indicated. Therefore the redundant selector 308 has the function of selecting the redundant data transmitted by the redundant master (for example, M0_r1) authorized by the redundant arbiter 309.

Comparing the electronic system 50 of FIG. 1A with the electronic system 350 of the embodiment shown in FIG. 3, the latter has the advantage of guaranteeing the correct operation of the system in case where a fault is present. In fact, the system 350 is able not only to detect a fault in the system, but also to mask a fault. For example, it is possible to detect a fault in the path between the masters M0, M1, . . . and the slave S0 (for example, the arbiter 6 fails): in this case, the controller 305 receives (at a certain moment in time) from selectors 8 and 308 some values which are equal of each other, while it receives from selector 7 a value that is different from the values received from selectors 8 and 308. The controller 305 is thus able to detect that a fault has occurred in the path between the masters M0, M1, . . . and the slave S0 (in the example, the fault is in the arbiter 6) and is able to mask the fault by using the value received from selectors 8 or 308.

Figure 4:
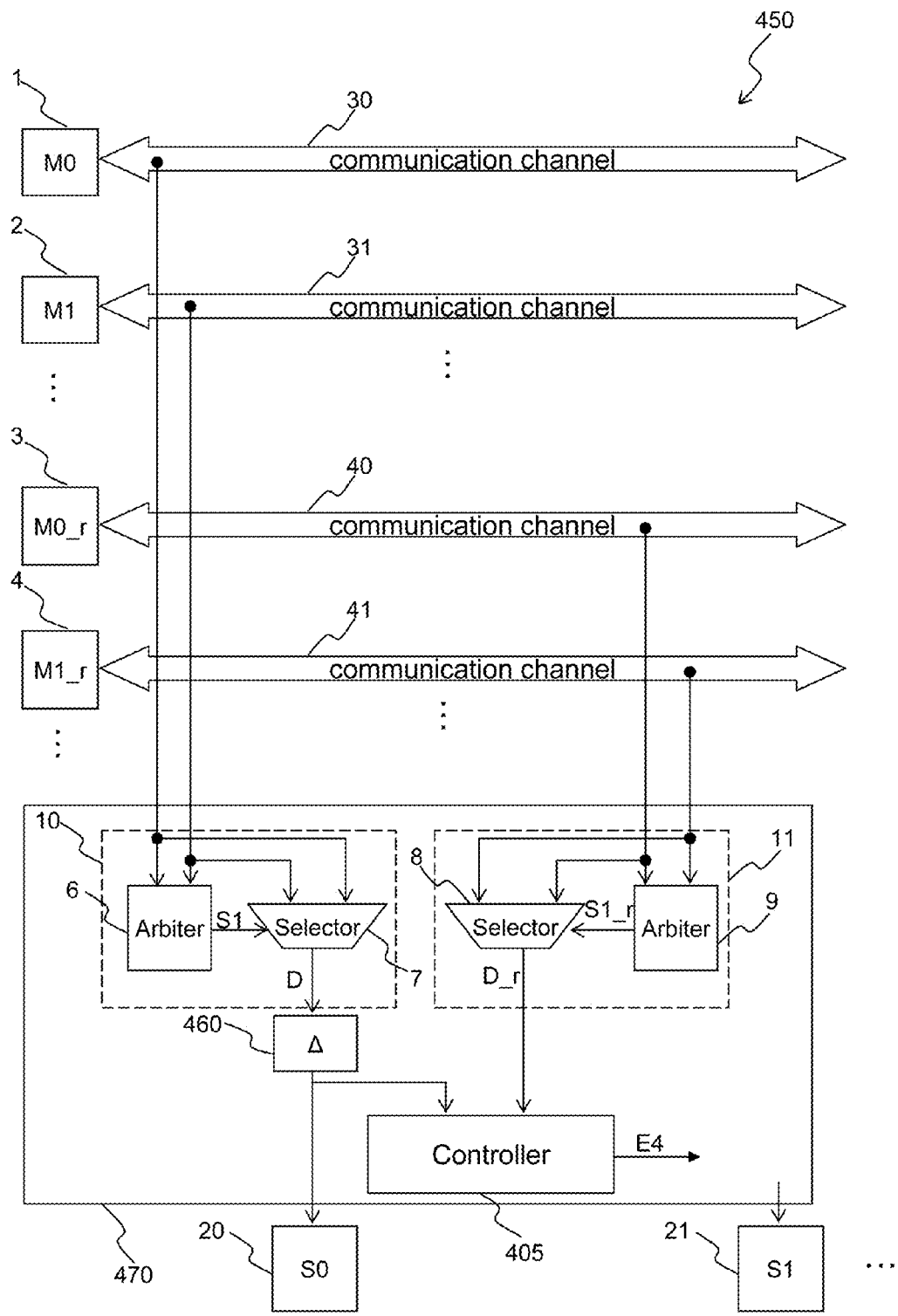

FIG. 4 shows an electronic system 450 according to another embodiment, similar to the embodiment in FIG. 1A, but wherein the electronic system 450 comprises a delay device 460 connected between the output of the selector 7 and the controller 405 and the slave device S0. The delay device 460 has the function to add a delay on the first data D selected by the selector 7: this has the advantage of reducing the probability that a fault on a master and a fault on the corresponding redundant master occur simultaneously (for example, on M1 and M1_r).

FIG. 5 shows an electronic system 550 according to an embodiment, similar to the embodiment in FIG. 1A, but wherein the electronic system 550 is such to operate according to at least two modes:

a first operation mode wherein the devices 503, 504, . . . have the function of replicating devices 1, 2, . . . respectively, as previously explained for devices 3, 4, . . . of the first embodiment of FIG. 1A;

a second operation mode wherein the devices 503, 504, . . . are such to operate in parallel to the devices 1, 2, . . . : in the case of a master-slave architecture for the system 550, the master devices M0, M1, . . . , M3, M4, . . . can transmit in the same time interval (for example, in the same clock signal cycle) data independent each other addressed to the same slave device S0, but only one of the masters M0, M1, . . . , M3, M4, . . . is authorized (via the devices 510 and 511) to access the slave device S0 in a certain time interval.

The device 510 is such to receive (via the communication channels 30, 31, . . . , 540, 541, . . . ) both the data transmitted by the first plurality of devices 1, 2, . . . and the data transmitted by the second plurality of devices 503, 504, . . . , and is such to provide an output of first data D500 selected from the data transmitted by the first plurality of devices 1, 2, . . . ; moreover, the device 510 comprises an input 500 such to receive the indication of the first or of the second operation mode for each device 1, 2, . . . , 503, 504, . . . and comprises another output 515 connected to an input of block 505 to provide a signal S503 indicating the operation of block 505 as a controller or as a selector (and, in the latter case, indicating which data to select from that transmitted by the devices of the first plurality). Similarly, device 511 is such to receive (via the communication channels 30, 31, . . . , 540, 541, . . . ) both the data transmitted by the first plurality of devices 1, 2, . . . and the data transmitted by the second plurality of devices 503, 504, . . . and is such to provide an output of other first data D501 selected from the data transmitted by the second plurality of devices 503, 504, . . . ; moreover, the device 511 comprises the input 500 such to receive the indication of the first or of the second operation mode for each device 1, 2, . . . , 503, 504, . . . and comprises another output 516 connected to an input of block 505 to provide a signal S504 indicating the operation of block 505 as a controller or as a selector (and, in the latter case, indicating which data to select from that transmitted by the devices of the second plurality).

Advantageously, in an embodiment when a device of the first plurality is such to operate in the first operation mode, the signal at the input 500 is such to indicate also the corresponding replicated device of the second plurality.

In an embodiment, the system 550 is such to be configured to operate according to a third operation mode which comprises both devices of the first plurality replicated by corresponding devices of the second plurality (for example, master M0 is replicated by master M3) and devices of the first plurality that operate in parallel to devices of the second plurality (in the example, master M1 works in parallel to master M4, that is master M1 is such to transmit in the same time interval data that are independent on the data transmitted by the master M4).

The block 505 has the function of controller to detect a fault in the system 550 when it operates in the first mode, of selector when the system 550 operates in the second mode, and both of controller and of selector when it operates in the third mode. In particular:

when the system 550 is such to operate in the first operation mode, block 505 is such to receive signal S503 on the input 515 indicating the operation of block 505 as a controller, is such to receive the first data D500 selected from device 510 and the first data D501 selected from device 511, is such to generate an error signal E5 indicating a fault in the system 550 and (if no faults have been detected in the system 550) is such to transmit to device 20 the first data D500 received from device 510 or the other first data D501 received from device 511;

when the system 550 is such to operate in the second operation mode, the block 505 is such to receive the signal S503 on the input 515 indicating the operation of block 505 as a selector (and indicating which data to select from that transmitted by the devices of the first plurality), is such to receive the first data D500 selected from device 510, is such to receive the signal S504 on the input 516 indicating the operation of block 505 as a selector (and indicating which data to select from that transmitted by the devices of the second plurality), is such to receive the first data D501 selected from device 511 and is such to transmit to the device 20 the first data D500 or D501 received from device 510 or 511, according to on the values of signals S503 and S504;

when the system 550 is such to operate in the third operation mode, the block 505 is such to receive, during the operation, the signal S503 on the input 515 indicating the operation of block 505 as a controller or selector (and, in the latter case, indicating which data to select from that transmitted by a device of the first plurality), is such to receive the first data D500 selected from device

510, is such to receive the signal S504 on the input 516 indicating the operation of block 505 as a controller or selector (and, in the latter case, indicating which data to select from that transmitted by a device of the second plurality), is such to receive the first data D501 selected from device 511, is such to generate an error signal E5 indicating a fault in the system 550 and is such to transmit to the device 20 the first data D500 or D501 received from device 510 or 511.

In an embodiment, the configuration of the system 550 can be changed dynamically between the first, the second and the third operation modes by changing the value of the signal on the input 500 of the arbiter 506 and 509.

In the case of a master-slave architecture for the system 550, the device 510 is implemented with an arbiter 506 such to receive the data transmitted by the masters M0, M1, . . . , M3, M4, . . . and such to generate therefrom an enable signal S501 and the signal S503; the device 510 further comprises a selector 507 such to receive the data transmitted by the masters M0, M1, . . . and such to select the data transmitted by one of the masters M0, M1, . . . , as a function of the enable signal S501. The arbiter 506 has the function to establish which one of the masters (or pairs of masters) M0, M1, . . . , M3, M4, . . . is authorized to access the slave S0 in a certain time interval (typically, in a certain period of the clock signal of the system 550), according to the various criteria previously indicated. Therefore the selector 507 has the function of selecting the data transmitted by the master (M0 or M1) authorized by the arbiter 506 to access the slave S0. Similarly, in the master-slave architecture the device 511 is implemented with another arbiter 509 such to receive the data transmitted by the masters M0, M1, . . . , M3, M4, . . . and such to generate therefrom another enable signal S502 and the other signal S504; the device 511 also comprises another selector 508 such to receive the data transmitted by the masters M3, M4, . . . and such to select the data transmitted by one of the masters M3, M4, . . . as a function of the enable signal S502. The arbiter 509 has the function to establish which one of the masters (or pairs of masters) M0, M1, . . . , M3, M4, . . . is authorized to access the slave S0 in a certain time interval (typically, in a certain period of the clock signal of the system 550), according to the various criteria previously indicated. Therefore the selector 508 has the function of selecting the data transmitted by the master (M3 or M4) authorized by the arbiter 509.

It should be noted that the arbiter 506 is such to receive the data transmitted by the masters M0, M1, . . . , M3, M4, . . . , while selector 507 is such to receive only the data transmitted by the masters M0, M1, . . . ; similarly, arbiter 509 is such to receive data transmitted by masters M0, M1, . . . , M3, M4, . . . , while the selector 508 is such to receive only data transmitted by masters M3, M4, . . . . In other words, each master device is connected to only one selector: this has the advantage of reducing the costs of the system 550 (because the connections between the devices in the system 550 are reduced), allowing at the same time the correct operation in the first, second or third modes.

For example, suppose that the system 550 operates in the third mode and is configured such that the master M3 transmits data redundant with respect to the data transmitted by the master M0 and that masters M1 and M4 transmit data independent each other (and from masters M0-M3). In this example, the arbiter 506 considers the data transmitted by M0 and M3 as a single request (that is like a pair M0-M3) and performs the arbitration between the pair M0-M3, the master M1 and the master M4, authorizing the pair M0-M3 or the master M1 or the master M4 to access the slave S0; similarly, in the same time interval the arbiter 511 considers the data transmitted by M0 and M3 as a single request (that is like a pair M0-M3) and performs the arbitration between the pair M0-M3, the master M1 and the master M4, authorizing the pair M0-M3 or the master M1 or the master M4 to access the slave S0:

if pair M0-M3 is authorized, the selector 507 selects (by means of the signal S501 received from the arbiter 506) the data transmitted by M0, while the selector 508 selects (by means of the signal S502 received from the arbiter 509) the data transmitted by M3, the block 505 receives the signal S503 from the input 515 indicating the operation as a controller, compares the data transmitted by M0 and M3 to detect possible faults in the system 550 and (if no faults are detected) transmits data D500 or D501 to the slave S0;

if master M1 is authorized, the selector 507 selects (by means of the signal S501 received from the arbiter 506) the data transmitted by M1, the block 505 receives on the input 515 the signal S503 indicating the operation as a selector and indicating the selection of first data D500, selects the first data D500 and transmits it to the slave S0;

if master M4 is authorized, the selector 508 selects (by means of the signal S502 received from the arbiter 509) the data transmitted by M4, the block 505 receives from input 515 the signal S504 indicating the operation as a selector and indicating the selection of the other first data D501, selects the other first data D501 and transmits it to the slave S0.

In an embodiment, when the system 550 is such to operate in the third mode, the type of access for the masters depends on the slave device and not on the master devices. For example:

the pair of masters M0-M3 accesses the slave S0 using a redundant path, while the same master M0 accesses another slave 51 in parallel with master M3, or the pair of masters M1-M4 accesses the slave S0 using a redundant path, while the same master M1 accesses another slave 51 in parallel with master M4.

Figure 5A:
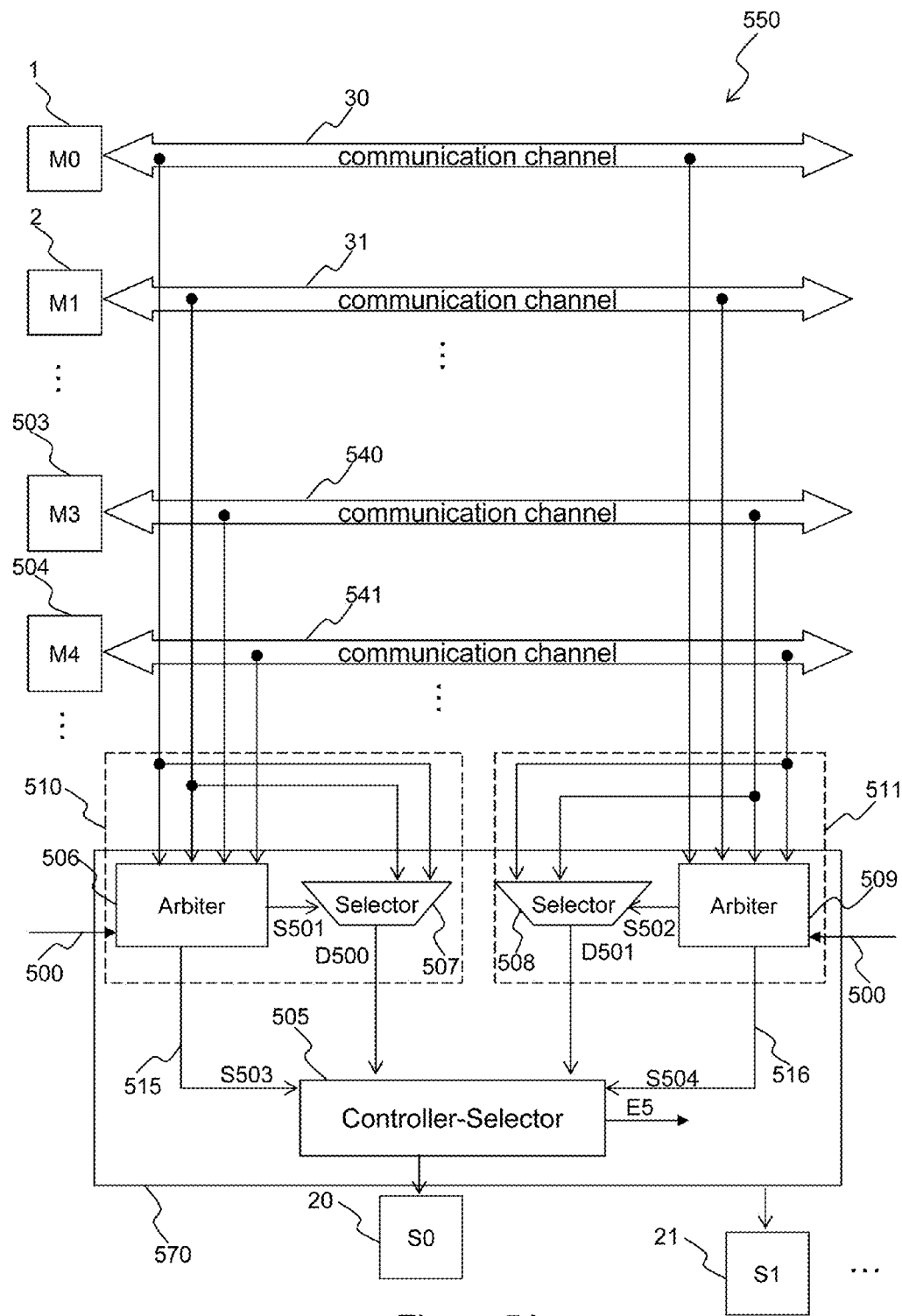
Figure 5B:
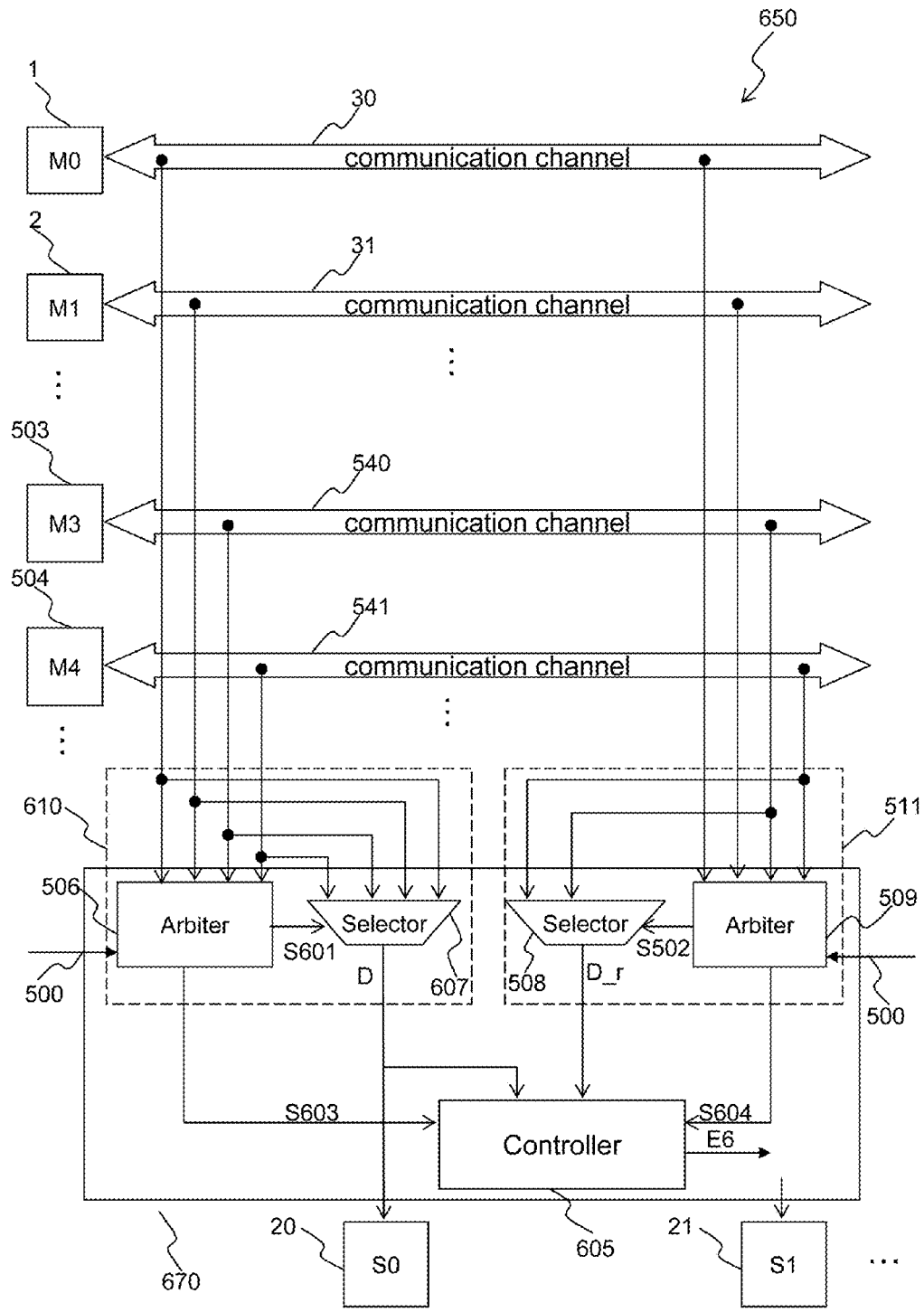

FIG. 5B shows an electronic system 650 similar to the one 550 in FIG. 5A, but wherein the block 605 is arranged in parallel with device 20. In this case, block 605 is such to operate only as a controller (in the time intervals indicated by the signals S603 and S604) and the selector 607 is such to receive both the data transmitted by the masters M0, M1, . . . and the data transmitted by the masters M3, M4, . . . , so that all the masters M0, M1, . . . , M3, M4, . . . can access the slave S0.

It should also be noted that, for simplicity, the embodiment in FIG. 1A only shows the devices 10, 11, 5 (and hence just one adapter device 70) necessary between the first and the second plurality of devices 1,2, . . . , 3,4, . . . and the device 20, but other devices similar to 10, 11, 5 (and thus another adapter device similar to 70) are necessary in the case where it is wished to perform the embodiments between the first and the second plurality of devices 1, 2, . . . , 3, 4, . . . and the device 21 (more in general, the same considerations can be applied to other possible devices 22, 23, . . . ). Similar considerations can be applied to the other embodiments shown in the Figures from 1B to 6.

Figure 6:
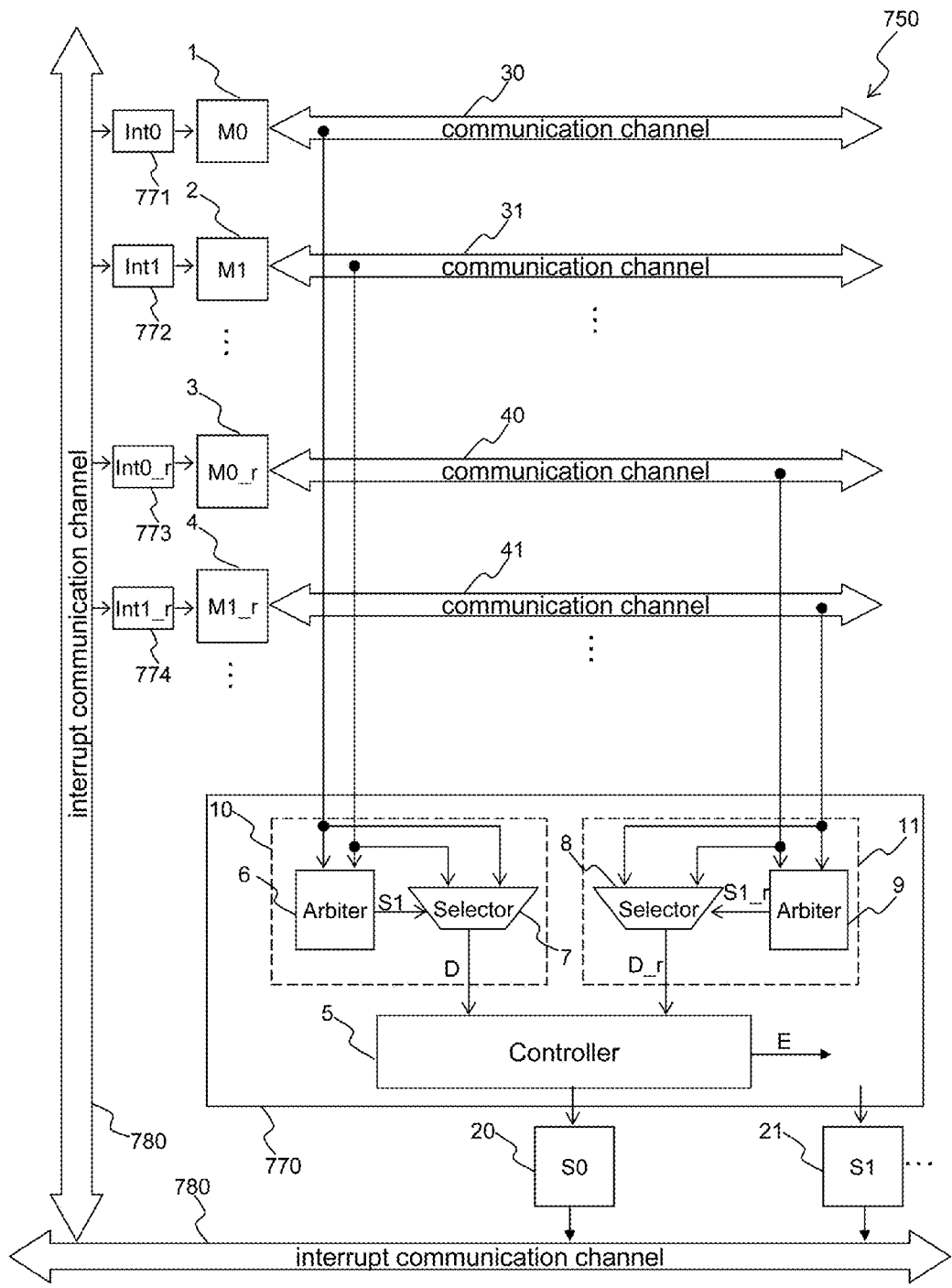

It should be noted that embodiments can be applied more general to detect faults of data originated by replicated devices (the masters M0, M1, . . . in the previously illustrated examples) and which are transmitted towards devices which are not replicated (the slaves S0, 51, . . . in the previously illustrated examples). With particular reference to FIG. 6, embodiments can be applied to the case of a fault in one or more interrupt controllers 771, 772, . . . (also indicated as Int0, Int1, . . . ): these are connected on one side to the communication channel of interrupt 780 and on the other side are connected to devices 1, 2, . . . respectively. The interrupt controllers 771, 772, . . . have the function to receive from the communication channel of the interrupt 780 the interrupt signal generated by one of the slaves S0, 51, . . . and to transmit it to the respective devices 1, 2, . . . . The interrupt controllers 771, 772, . . . are replicated by respective redundant interrupt controllers 773, 774, . . . (also indicated as Int0_r, Int1_r, . . . ), which are connected to devices 3, 4, . . . respectively. In case of a fault of the interrupt controller Int0 (for example, the interrupt controller Int0 generates the indication of an interrupt of the device 20 which actually did not occur, or generates the indication of an interrupt of the device 20 but the interrupt was actually generated by device 21), the device 1 (for example, a processor) executes the code corresponding to the interrupt service routine of the device 20; on the contrary, the redundant interrupt controller Int0_r connected to the device 3 does not receive the indication of an interrupt of the device 20 and thus the device 3 does not execute the code corresponding to the interrupt service routine of the device 20. Consequently, the controller 5 receives the first data D different from the first redundant data D_r and thus detects that a fault has occurred in the system 750.

Advantageously, each master device of the different embodiments may be connected to a decoder (not shown in the figures) which has the function of receiving the data transmitted by the master, of receiving the addresses that identify the slave devices and of checking if the master device has requested an operation that is allowed on the addressed slave device:

in the affirmative case, the decoder transmits the data received from the master (possibly modified) over the communication channel and this data will contend (with the other masters) for the access to the slave device, or in the negative case, the decoder transmits an indication to the master device that it is not possible to perform this operation on the slave device and does not transmit the data received from the master over the communication channel.

It should be noted that the meaning of the devices of the first and second (or third) plurality is not limited only to the devices (for example, processors) which implement the logic for the generation and transmission of data, but can also include other possible control devices (for example, the decoders, the interrupt controllers, the slave memory controllers) that are replicated, that is such to transmit data and redundant data to a device which is not replicated.

Advantageously, in an embodiment it is reduced the probability of common faults between:

a device of the first plurality and the path comprises between a device of the first plurality and the device 20; and a device of the second plurality and the redundant path comprised between the corresponding device of the second plurality and the device 20.

This may be achieved by using appropriate expedients during the process of synthesis and/or placement of the blocks synthesized in an integrated circuit.

For example, with reference to FIG. 1A, the device 10 and the redundant device 11 may be synthesized according to at least one of the following criteria:

1. different cells of the technological library used by the synthesis process are used. For example, the device 10 is synthesized using only NOR type cells for implementing the combinatorial logic and redundant device 11 is synthesized using only NAND type cells. In this way, internal signals are synthesized that are different between the device 10 and the redundant device 11.

2. the position and/or orientation of the input/output data terminals of the device 10 in the integrated circuit is different from the position and/or the orientation of the input/output data terminals of the redundant device 11 in the integrated circuit.

3. the position and/or orientation of the power supply terminals of the device 10 in the integrated circuit is different from the position and/or orientation of the power supply terminals of redundant device 11 in the integrated circuit.

4. the position of the clock signal tree of the device 10 in the integrated circuit is different from the position of the clock signal tree of the redundant device 11 in the integrated circuit.

5. the position and/or orientation of the device 10 in the integrated circuit is different from the position and/or orientation of the redundant device 11 in the integrated circuit: for example, the device 10 is synthesized in a position sufficiently far from the position of the redundant device 11. In this way, the supply signals of the device 10 are different from the supply signals of the redundant device 11 and/or of the clock signal tree of the device 10 is different from the clock signal tree of the redundant device 11 and/or the temperature of the device 10 is different from the temperature of the redundant device 11.

The electronic adapter device and the electronic system according to an embodiment can be used in the aeronautic or automotive field, wherein it is important that faults occurring in the electronic systems are detected in real time (in order to activate an alternative mechanism, possibly also mechanical) or are automatically protected at electronic level. For example, in the automotive sector, it is important to detect a fault in the electronic systems which improve the vehicle safety, in particular of brakes, such as ABS (Antilock Braking System), ESP (Electronic Stability Control) and EPS (Electric Power Steering).

Advantageously, the electronic system according to an embodiment is implemented into an integrated circuit.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic hardware device comprising:
a receiving device configured to receive data from a first plurality of electronic devices and to select therefrom first data, the receiving device including:
   an arbiter configured to receive the data from the first plurality of electronic devices and to generate therefrom an enable signal; and
   a selector configured to receive the data from the first plurality of electronic devices and to select therefrom the first data as a function of the enable signal;
a redundant receiving device configured to receive redundant data from a second plurality of redundant devices and to select therefrom first redundant data; and
a controller configured to detect errors in the first plurality of electronic devices and in the receiving device based on the selected first data and the selected first redundant data and to generate an error signal in response to either one of the detected errors.

2. The electronic device of claim 1 wherein:
the redundant receiving device comprises:
   a redundant arbiter configured to receive the redundant data from the second plurality of redundant devices and to generate therefrom a redundant enable signal; and
   a redundant selector configured to receive the redundant data from the second plurality of redundant devices and to select therefrom the first redundant data as a function of the redundant enable signal; and
the error signal indicates a detected fault of at least one of an electronic device of the first plurality, of the arbiter, and of the selector.

3. The electronic device of claim 1, further comprising a delay device configured to delay the selected first data.

4. The electronic device of claim 1 wherein the error signal indicates a location of a detected fault.

5. An electronic hardware system comprising:
a first plurality of electronic devices configured to transmit data;
a second plurality of electronic devices configured to transmit redundant data;
a receiving device configured to receive the data from the first plurality of electronic devices and to select first data, the receiving device including:
   an arbiter configured to receive the data from the first plurality of electronic devices and to generate therefrom an enable signal; and
   a selector configured to receive the data from the first plurality of electronic devices and to select therefrom the first data as a function of the enable signal;
a redundant receiving device configured to receive the redundant data from the second plurality of electronic devices and to select first redundant data;
a controller configured to detect faults in the first plurality of electronic devices and in the receiving device based on the selected first data and the selected first redundant data, to generate an error signal in response to a detected fault, and to transmit the selected first data or the selected first redundant data; and
an output-receiving device configured to receive the data transmitted by the controller.

6. The electronic system of claim 5 wherein the error signal indicates a location of a detected fault.

7. The electronic system of claim 5 wherein:
the redundant device comprises:
   a redundant arbiter configured to receive the redundant data from the second plurality of electronic devices and to generate therefrom a redundant enable signal; and
   a redundant selector configured to receive the redundant data from the second plurality of electronic devices and to select therefrom the first redundant data as a function of the redundant enable signal; and
the error signal indicates a fault of at least one of an electronic device of the first plurality, of the arbiter, and of the selector.

8. The electronic system of claim 7, further comprising:
a third plurality of electronic devices configured to transmit a second set of redundant data corresponding to the data transmitted by the first plurality of electronic devices; and
a second redundant device configured to receive the second set of redundant data and to select therefrom second redundant data, the second redundant device comprising:
   a second redundant arbiter configured to receive the second set of redundant data and to generate therefrom a second redundant enable signal; and
   a second redundant selector configured to receive the second set of redundant data and to select therefrom the second redundant data as a function of the second redundant enable signal, wherein the controller is further configured to receive the second redundant data and to selectively generate the error signal as a function of the selected first data, of the selected first redundant data and of the selected second redundant data.

9. The electronic system of claim 5, further comprising a transmitting device configured to transmit data different from the data transmitted by the devices of the second plurality, and wherein:
the receiving device is further configured to receive the data transmitted by the transmitting device and to select the first data from the data transmitted by the transmitting device and the data transmitted by the first plurality of electronic devices; and
the redundant device is further configured to receive the data transmitted by the transmitting device and to select the first redundant data from data transmitted by the transmitting device and the redundant data transmitted by the second plurality of electronic devices.

10. The electronic system of claim 5, further comprising:
a third plurality of electronic devices configured to transmit a second set of redundant data corresponding to the data transmitted by the first plurality of electronic devices; and
a second redundant device configured to receive the second set of redundant data and to select therefrom second redundant data, wherein the controller is further configured to receive the second redundant data and to selectively generate the error signal as a function of the selected first data, of the selected first redundant data and of the selected second redundant data.

11. The electronic system of claim 5, further comprising a delay device configured to delay the selected first data.

12. The electronic system of claim 5 wherein:
the arbiter is configured to receive the redundant data from the second plurality of electronic devices and a mode control signal; and
the redundant device comprises:
a redundant arbiter configured to receive the redundant data from the second plurality of electronic devices and to generate therefrom a redundant enable signal, and to receive the data from the first plurality of electronic devices and the mode control signal; and
a redundant selector configured to receive the redundant data from the second plurality of electronic devices and to select therefrom the first redundant data as a function of the redundant enable signal; and
wherein in a first operation mode the electronic devices of the second plurality are configured to transmit redundant data corresponding to the data transmitted by the electronic devices of the first plurality, and wherein in a second operation mode the electronic devices of the second plurality are configured to transmit data independent of the data transmitted by the electronic devices of the first plurality.

13. The electronic system of claim 5, further comprising:
communication channels between the first plurality of electronic devices and the receiving device and between the second plurality of electronic devices and the redundant receiving device, wherein the controller is configured to selectively generate the error signal upon detecting a fault in the communication channels.

14. The electronic system of claim 5 wherein the system is configured in a master-slave architecture, the first plurality of electronic devices are master devices, the second plurality of electronic devices are redundant master devices, the output-receiving device is a slave device, the receiving device is configured to generate an enable signal indicating a master of the first plurality authorized to access the slave device, the redundant receiving device is configured to generate a redundant enable signal indicating an authorized redundant master of the second plurality, and the slave device is configured to receive the data transmitted by the authorized master.

15. An electronic hardware system comprising:
a first plurality of electronic devices configured to transmit data;
a second plurality of electronic devices configured to transmit redundant data;
a receiving device configured to receive the data from the first plurality of electronic devices and to select and transmit first data, the receiving device including:
an arbiter configured to receive the data from the first plurality of electronic devices and to generate therefrom an enable signal; and
a selector configured to receive the data from the first plurality of electronic devices and to select therefrom the first data as a function of the enable signal;
a redundant receiving device configured to receive the redundant data from the second plurality of electronic devices and to select first redundant data;
a controller configured to detect faults in an electronic device of the first plurality of electronic devices and in the receiving device based on the selected first data and the selected first redundant data, and to generate an error signal in response to a detected fault; and
an output-receiving device configured to receive the data transmitted by the receiving device.

16. The electronic system of claim 15 wherein the error signal indicates a location of a detected fault.

17. The electronic system of claim 15 wherein:
the redundant receiving device comprises:
a redundant arbiter configured to receive the redundant data from the second plurality of electronic devices and to generate therefrom a redundant enable signal; and
a redundant selector configured to receive the redundant data from the second plurality of electronic devices and to select therefrom the first redundant data as a function of the redundant enable signal; and
the error signal indicates a fault of at least one of an electronic device of the first plurality, of the arbiter, and of the selector.

18. The electronic system of claim 17, further comprising:
a third plurality of electronic devices configured to transmit a second set of redundant data corresponding to the data transmitted by the first plurality of electronic devices; and
a second redundant device configured to receive the second set of redundant data and to select therefrom second redundant data, the second redundant device comprising:
a second redundant arbiter configured to receive the second set of redundant data and to generate therefrom a second redundant enable signal; and
a second redundant selector configured to receive the second set of redundant data and to select therefrom the second redundant data as a function of the second redundant enable signal, wherein the controller is further configured to receive the second redundant data and to generate the error signal as a function of the selected first data, of the selected first redundant data and of the selected second redundant data.

19. The electronic system of claim 15, further comprising a transmitting device configured to transmit data different from the data transmitted by the devices of the second plurality, and wherein:
the receiving device is further configured to receive the data transmitted by the transmitting device and to select the first data from the data transmitted by the transmitting device and the data transmitted by the first plurality of electronic devices; and
the redundant device is further configured to receive the data transmitted by the transmitting device and to select the first redundant data from data transmitted by the transmitting device and the redundant data transmitted by the second plurality of electronic devices.

20. The electronic system of claim 15, further comprising:
a third plurality of electronic devices configured to transmit a second set of redundant data corresponding to the data transmitted by the first plurality of electronic devices; and a second redundant device configured to receive the second set of redundant data and to select therefrom second redundant data, wherein the controller is further configured to receive the second redundant data and to generate the error signal as a function of the selected first data, of the selected first redundant data and of the selected second redundant data.

21. The electronic system of claim 15, further comprising a delay device configured to delay the selected first data.

22. The electronic system of claim 15 wherein:
the arbiter is configured to receive the redundant data from the second plurality of electronic devices and a mode control signal;
the redundant device comprises:
a redundant arbiter configured to receive the redundant data from the second plurality of electronic devices and to generate therefrom a redundant enable signal, and to receive the data from the first plurality of electronic devices and the mode control signal; and
a redundant selector configured to receive the redundant data from the second plurality of electronic devices and to select therefrom the first redundant data as a function of the redundant enable signal; and
wherein in a first operation mode the electronic devices of the second plurality are adapted to transmit redundant data corresponding to the data transmitted by the electronic devices of the first plurality, and wherein in a second operation mode the electronic devices of the second plurality are adapted to transmit data independent on the data transmitted by the electronic devices of the first plurality.

23. The electronic system of claim 15, further comprising:
communication channels between the first plurality of electronic devices and the receiving device and between the second plurality of electronic devices and the redundant receiving device, wherein the controller is configured to generate the error signal upon detecting a fault in the communication channels.

24. The electronic system of claim 15 wherein the system is configured in a master-slave architecture, the first plurality of electronic devices are master devices, the second plurality of electronic devices are redundant master devices, the output-receiving device is a slave device, the enable signal indicates a master of the first plurality authorized to access the slave device, the redundant enable signal indicates an authorized redundant master of the second plurality, and the slave device is configured to receive the data transmitted by the authorized master.

25. A non-transitory computer readable memory medium whose contents cause a system having at least one processor to perform a method, the method comprising:
selecting, under control of the at least one processor, first data from data transmitted by a first plurality of electronic devices;
selecting, under control of the at least one processor, second data from data transmitted by a second plurality of electronic devices;
detecting, under control of the at least one processor, errors in an electronic device of the first plurality and in the selecting of the first data based on the first data and the second data;
generating an error signal in response to a detected error; and
delaying the selected first data.

26. The computer readable medium of claim 25 wherein the error signal indicates a location of a detected fault.

27. The computer readable medium of claim 25 wherein the method further comprises selectively outputting, under control of the at least one processor, the selected first data or the selected second data.

28. A non-transitory computer readable memory medium whose contents cause a system having at least one processor to perform a method, the method comprising:
selecting, under control of the at least one processor, first data from data transmitted by a first plurality of electronic devices;
selecting, under control of the at least one processor, second data from data transmitted by a second plurality of electronic devices;
detecting, under control of the at least one processor, errors in an electronic device of the first plurality and in the selecting of the first data based on the first data and the second data and
generating an error signal in response to a detected error, wherein,
selecting the first data comprises generating, under control of the at least one processor, a first enable signal and the selection of the first data is based on the first enable signal;
selecting the second data comprises generating, under control of the at least one processor, a second enable signal and the selection of the second data is based on the second enable signal; and
the error signal is active in response to a fault in the generation of the enable signal.

29. The computer readable medium of claim 28 wherein the method further comprises delaying the selected first data.

30. A hardware system, comprising:
means for selecting first data from data transmitted by a first plurality of electronic devices;
means for selecting second data from data transmitted by a second plurality of electronic devices; and
means for detecting errors in the first plurality of electronic devices and in the means for selecting first data, wherein
the means for selecting first data is configured to generate a first enable signal based on data transmitted by the first plurality of electronic devices and the selection of the first data is based on the first enable signal; and
the means for selecting the second data is configured to generate a second enable signal and the selection of the second data is based on the second enable signal.

31. The system of claim 30, further comprising:
means for selecting third data from data transmitted by a third plurality of electronic devices, wherein the error signal is generated based on the selected first data, the selected second data and the selected third data.

32. The system of claim 30 wherein:
in a first operation mode the electronic devices of the second plurality are configured to transmit redundant data corresponding to the data transmitted by the electronic devices of the first plurality; and
in a second operation mode the electronic devices of the second plurality are configured to transmit data independent of the data transmitted by the electronic devices of the first plurality.

* * * * *